United States Patent
Veselic et al.

(10) Patent No.: US 7,791,319 B2
(45) Date of Patent: Sep. 7, 2010

(54) CIRCUIT AND METHOD OF OPERATION FOR AN ELECTRICAL POWER SUPPLY

(75) Inventors: Dusan Veselic, Oakville (CA); Martin G. A. Guthrie, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 657 days.

(21) Appl. No.: 10/372,180

(22) Filed: Feb. 21, 2003

(65) Prior Publication Data

US 2004/0164708 A1    Aug. 26, 2004

(51) Int. Cl.
H02J 7/00   (2006.01)
H02J 7/04   (2006.01)
H02J 7/14   (2006.01)
G01R 19/12  (2006.01)

(52) U.S. Cl. ............ 320/158; 320/134; 320/132; 320/159; 320/160; 307/32; 307/152

(58) Field of Classification Search ............ 320/112, 320/107, 113, 114, 137, 152, 157, 159, 160, 320/132, 134, 21, 32, 39, 40, 115, 156, 165, 320/158, 155; 307/32, 34, 38, 39, 152, 159
See application file for complete search history.

(56) References Cited

U.S. PATENT DOCUMENTS

| | | | |
|---|---|---|---|
| 3,775,659 A | 11/1973 | Carlsen, II | 320/140 |
| 4,433,251 A | 2/1984 | Banks et al. | 327/540 |
| 4,510,431 A | 4/1985 | Winkler | 320/103 |
| 4,755,816 A * | 7/1988 | DeLuca | 340/7.37 |
| 5,173,855 A | 12/1992 | Nielsen et al. | 700/284 |
| 5,179,335 A * | 1/1993 | Nor | 320/159 |
| 5,229,649 A | 7/1993 | Nielsen et al. | 307/31 |

(Continued)

FOREIGN PATENT DOCUMENTS

DE    201 16 332 U 1    1/2002

(Continued)

OTHER PUBLICATIONS

Electric Double-Layer Capacitors, vol. 2, Oct. 25, 1996 (Japan, Tokin Corp., Cat. No. EC-200E).

(Continued)

*Primary Examiner*—Edward Tso
*Assistant Examiner*—Alexis Boateng
(74) *Attorney, Agent, or Firm*—Finnegan, Henderson, Farabow, Garrett & Dunner, LLP

(57) ABSTRACT

A battery charging circuit comprising: a semiconductor switch having an output connected to a rechargeable battery; a battery charge controller for receiving power from an external source, and supplying output power to a portable device and the input of the semiconductor switch, the current output of the battery charge controller being controllable; and a voltage sensing circuit for: measuring the voltage drop across the battery charge controller; and responding to the voltage drop across the battery charge controller by modulating the semiconductor switch to reduce the quantity of current supplied to the rechargeable battery when the voltage drop is too great; whereby the total power dissipated by the battery charge controller is controlled, the portable device receiving the power it needs to operate and the rechargeable battery receiving any additional available power.

20 Claims, 8 Drawing Sheets

U.S. PATENT DOCUMENTS

| | | | | |
|---|---|---|---|---|
| 5,272,475 | A | 12/1993 | Eaton et al. | 320/155 |
| 5,444,378 | A | 8/1995 | Rogers | 320/136 |
| 5,631,503 | A | 5/1997 | Cioffi | 307/66 |
| 5,638,540 | A | 6/1997 | Aldous | 713/300 |
| 5,651,057 | A | 7/1997 | Blood et al. | 379/106.07 |
| 5,769,877 | A | 6/1998 | Barreras, Sr. | 607/61 |
| 5,804,894 | A * | 9/1998 | Leeson et al. | 307/130 |
| 5,850,113 | A | 12/1998 | Weimer et al. | 307/125 |
| 5,926,006 | A * | 7/1999 | Burroughs et al. | 320/114 |
| 5,939,860 | A | 8/1999 | William | 320/114 |
| 6,100,664 | A * | 8/2000 | Oglesbee et al. | 320/125 |
| 6,104,162 | A | 8/2000 | Sainsbury et al. | 320/111 |
| 6,104,759 | A | 8/2000 | Carkner et al. | 323/282 |
| 6,118,254 | A | 9/2000 | Faulk | 320/141 |
| 6,130,518 | A * | 10/2000 | Gabehart et al. | 320/103 |
| 6,140,801 | A * | 10/2000 | Aoki et al. | 320/132 |
| 6,172,478 | B1 * | 1/2001 | Leppo et al. | 320/116 |
| 6,191,552 | B1 * | 2/2001 | Kates et al. | 320/112 |
| 6,211,649 | B1 * | 4/2001 | Matsuda | 320/115 |
| 6,300,744 | B1 | 10/2001 | Shum | 320/137 |
| 6,362,610 | B1 | 3/2002 | Yang | |
| 6,437,543 | B1 * | 8/2002 | Oler et al. | 320/150 |
| 6,498,458 | B1 * | 12/2002 | Chen | 320/114 |
| 6,664,764 | B1 * | 12/2003 | Odaohhara | 320/132 |
| 6,801,967 | B2 * | 10/2004 | Nakamura et al. | 710/62 |
| 2001/0004310 | A1 * | 6/2001 | Kono | 361/683 |
| 2003/0052547 | A1 * | 3/2003 | Fischer et al. | 307/154 |
| 2003/0076138 | A1 * | 4/2003 | Hwang | 327/143 |

FOREIGN PATENT DOCUMENTS

WO PCT/CA2004/000249     9/2004

OTHER PUBLICATIONS

Supercapacitor: User's Manual, vol. 2 (Japan, Tokin Corp., date. unknown).

Charging Big Supercaps, Portable Design, p. 26, Mar. 1997.

\* cited by examiner

CIRCUIT AND METHOD OF OPERATION FOR AN ELECTRICAL POWER SUPPLY

This invention relates in general to battery chargers, and more specifically to a method and apparatus for charging a battery in a portable communication device from a variety of power sources, including limited capacity sources such as an integral power node of a computer data bus. One such computer data bus would be a USB (universal serial bus) port.

BACKGROUND OF THE INVENTION

With the current computing and information revolution, portable electronic devices such as cellular telephones, personal digital assistants (PDAs), digital pagers and wireless email devices, are becoming very common. These portable devices are typically powered by internal batteries which must be recharged periodically by an external power source, using a battery charger. Battery chargers generally receive power from a standard AC electrical outlet and convert the AC power into a low DC voltage for recharging a battery.

The battery chargers of these portable devices also generally employ a "battery charge controller" to manage the charging of the battery. Such battery charge controllers offer functionality such as:
  regulating the voltage and current levels to the rechargeable battery;
  providing status signals to the main processor of the portable device, or operating one or more status LEDs (light emitting diodes);
  providing protection circuits such as overcurrent, undervoltage, reverse polarity and overtemperature protection; and
  shutting themselves off when the charging source has been removed, to minimize battery drain.

Lithium ion battery packs, for example, must be charged according to a relatively strict algorithm so that they can be fully charged, be charged and re-charged many times, and be safely operated. This charging algorithm generally proceeds as follows:
  1. at the first stage, any severe undervoltage or deep discharge conditions are addressed. During this pre-charging stage, the battery voltage is gently brought up from a very low or dead state, usually at a rate of $\frac{1}{10}$ of the regular charge current;
  2. next, the battery is charged at a constant current level, until the voltage across the battery reaches its design level (say, 4.2 VDC). At this point the battery will only be at 40 to 70% of full capacity; and then
  3. charging of the battery continues at a constant voltage level (again, say 4.2 VDC) until it is fully charged. In this mode, the current drawn by the battery will drop over time. When the charge current has dropped to 10% of the initial charge rate, or some other limit determined by the battery manufacturer, charging is stopped.

Charging must stop at this point because trickle charging is not acceptable for lithium batteries; an overcharge will damage the cells, possibly plating out lithium metal and becoming hazardous. Hence, lithium batteries are almost invariably used with battery charge controllers designed to their particular charging parameters.

Unfortunately, most battery charge controllers are designed to draw from a high capacity power supply with a steady voltage that will not sag appreciably under its current demands. This is a problem when one attempts to use a power supply with limited capacity. Some computer data buses such as USB (universal serial bus) buses can be used to provide power to external devices, but while such power supplies are very convenient, they have limited capacity.

The majority of personal computers (PCs) and laptop computers available today, are provided with one or more USB ports as standard components. USB ports are designed to support data communication at speeds of 12 megabits and 1.5 megabits per second, support PnP (Plug and Play) installation software, and support hot plugging (i.e. devices can be connected and disconnected while the PC is running). Thus, USB ports are often used as interfaces to connect keyboards, mouses, game controllers, printers and scanners to PCs. As well, USB ports are operable to supply limited power to connected external devices. The standard USB specification requires that "high-power" USB ports be operable to provide a supply voltage of 4.75-5.25 VDC and a supply current of at least 500 mA (often referred to as "five units"). The specification for "low-power" USB ports requires a supply voltage of 4.40-5.25 VDC and current of 100 mA (referred to as "one unit").

USB ports would seem to be a very logical choice as a power supply for portable devices for a number of reasons. To being with, USB ports supply a low DC voltage supply which is often very close to, or just above, the voltage of the battery being charged (many portable devices having battery voltages in the range of 2.5-4.5 VDC). As well, many portable devices may be operable to upload and download data or software, to and from a personal computer or a laptop computer (often referred to as "syncing"). Thus, many portable devices are supplied with docking cradles as shown in the system diagram of FIG. 1. This is quite a straightforward system, as the docking cradle 10 is connected to a USB port 12 of a personal computer (PC) 14, via a simple USB cable and connectors 16. The portable device 18 need only be set down in the docking cradle 10 and an electronic connection to the PC 14, is made.

If the USB port 12 has sufficient power, it makes much more sense to use the USB port 12 to supply charging power to the portable device 18, rather than using a separate AC charger. For example:
  1. a USB power supply will have less electrical noise than an AC charger, unless the AC charger incorporates large DC capacitors or inductors;
  2. an AC charger requires either a heavy transformer or an expensive switching power supply, neither of which would be required if USB power is used;
  3. in the USB power supply implementation, the cable and connectors 16 used to connect the docking cradle 10 to the PC 14 could be used to carry both power and data, so no extra physical components would be required at all. In contrast, an AC power supply would have to be provided as a separate physical component from a USB data cable; and
  4. there are no universal standards for AC power supplies; a given AC power supply may require 120VAC or 240VAC as an input, and may provide 3, 4.5, 6, 7.5 or 9 VDC out, with one of large number of different possible connectors and polarities. A traveller who forgets his AC power supply at home, may not be able to find a suitable replacement.

In contrast, the USB standard is widely accepted, so that a traveller whose mobile device is equipped with a USB connector will have a much greater chance of finding a charging source.

Thus, it would clearly be desirable to use USB power to charge portable devices. Unfortunately though, as noted above, USB ports can only provide limited power. The problem becomes clear when considering the block diagram of FIG. 2. In this scenario, the portable device 18 and the battery charge controller 20 are connected to the USB port 12 in parallel, as under charging conditions the control switch 22 will be toggled so that the portable device 18 draws power from the USB port 12. When the battery 24 has become fully charged by the battery charge controller 20 and the USB port 12 power removed, the control switch 22 is then toggled so that the portable device 18 draws power from the battery 24. This type of circuit may work in some circumstances, but it is not acceptable where the power source has limited capacity.

If one attempts to power the portable device 18 and battery charge controller 20 simultaneously from the USB card 12, it is quite likely that too great a load would be placed on the USB card 12. The excessive load on the USB card 12 may result in an undervoltage or low current condition that could result in a number of undesirable problems such as: the battery 24 not becoming properly charged or becoming permanently damaged, or the portable device 18 operating erratically or becoming damaged.

As an alternative, the battery 24 and portable device 18 could be arranged as shown in FIG. 3 so that they are both fed by the battery charge controller 20. While such a design would reduce the total power drawn by the portable device 18 and battery 24 in combination, there are a number of other problems:

1. most importantly, there is still no control over the total power that is drawn from the USB port 12;
2. the power drawn by the portable device 18 could disturb the carefully designed protection and charging mechanisms of the battery charge controller 20;
3. the portable device 18 and battery 24 compete arbitrarily for the available power, so they may adversely affect the operation of one another. If the available voltage drops too low, or insufficient current is available, either device may operate erratically, or fail all together;
4. if the battery 24 is in a deep-discharge state when power is turned on, the voltage to the portable device 18 will be dragged down to the level of the deep-discharged battery. Typically, portable devices 18 will not be operable at such a low voltage level; and
5. the current that must be supplied to the battery 24 and the portable device 18 must be dissipated by the battery charge controller 20 or an external semiconductor in some way. The more power that is dissipated, the larger the battery charge controller 20 (or the external semiconductor driven by the battery charge controller 20) must be. Generally, a semiconductor's ability to dissipate power varies with its surface area, thus, if the power dissipation is doubled, the semiconductor must increase by four times the surface area.

New, dedicated battery charge controllers could be developed which are designed to operate with a USB power supply and a portable device 18, but that would be an expensive and complicated solution. Each battery charge controller would have to be designed to suit a particular pairing of a portable device 18 and battery 24 because it would have to take the power consumption requirements of both components into account.

There is therefore a need for a method and apparatus which allows standard computer data busses such as USB ports to simultaneously power portable devices 18 and their associated battery charge circuits 20 without having to design new battery charge controllers with very specific applications. This design must be provided with consideration for the tight operating parameters of battery charging circuits, the limited physical board area in portable devices, and the reliability and complexity of the design.

SUMMARY OF THE INVENTION

It is therefore an object of the invention to provide a novel method and apparatus which allows standard battery charge controllers to be supplied from standard computer data ports and other power sources, which obviates or mitigates at least one of the disadvantages of the prior art.

One aspect of the invention is broadly defined as a battery charging circuit comprising: a semiconductor switch having an output connected to a rechargeable battery; a battery charge controller for receiving power from an external source, and supplying output power to a portable device and the input of the semiconductor switch, the current output of the battery charge controller being controllable; and a voltage sensing circuit for: measuring the voltage drop across the battery charge controller; and responding to the voltage drop across the battery charge controller by modulating the semiconductor switch to reduce the quantity of current supplied to the rechargeable battery when the voltage drop is too great; whereby the total power dissipated by the battery charge controller is controlled, the portable device receiving the power it needs to operate and the rechargeable battery receiving any additional available power.

Another aspect of the invention is defined as a battery charging circuit comprising: a battery charge controller connected to the external power supply and electrifying a battery and a portable device, and having a maximum current setting; and a regulating circuit for sensing the voltage drop across the battery charge controller, and modulating the current to the battery to keep the power dissipated by the battery charge controller below a predetermined level.

An additional aspect of the invention is defined as a method for charging a battery of a portable device via an external power supply, the method comprising the steps of: connecting the input of a battery charge controller to the external power supply; connecting the output of the battery charge controller, in parallel, to the portable device and the input of a semiconductor switch; connecting the output of the semiconductor switch to the battery; controlling the current output of the battery charge controller; measuring the voltage drop across the battery charge controller; and responding to the voltage drop across the battery charge controller by modulating the semiconductor switch to reduce the quantity of current supplied to the rechargeable battery when the voltage drop is too great; whereby the total power dissipated by the battery charge controller is controlled, the portable device receiving the power it needs to operate and the rechargeable battery receiving any additional available power.

A further aspect of the invention is defined as a power supply circuit comprising: means for measuring the voltage drop across a battery charge controller providing power to a portable device and the input of a semiconductor switch in parallel; means for controlling the current output of the battery charge controller; and means for responding to the voltage drop across the battery charge controller by modulating the semiconductor switch to reduce the quantity of current supplied to the rechargeable battery when the voltage drop is too great; whereby the total power dissipated by the battery charge controller is controlled, the portable device receiving the power it needs to operate and the rechargeable battery receiving any additional available power.

BRIEF DESCRIPTION OF THE DRAWINGS

These and other features of the invention will become more apparent from the following description in which reference is made to the appended drawings in which.

DESCRIPTION OF THE INVENTION

As explained above, there is currently no effective design which is capable of powering both a portable device 18 and a rechargeable battery 24 from a power supply with limited capacity.

Figure 1:
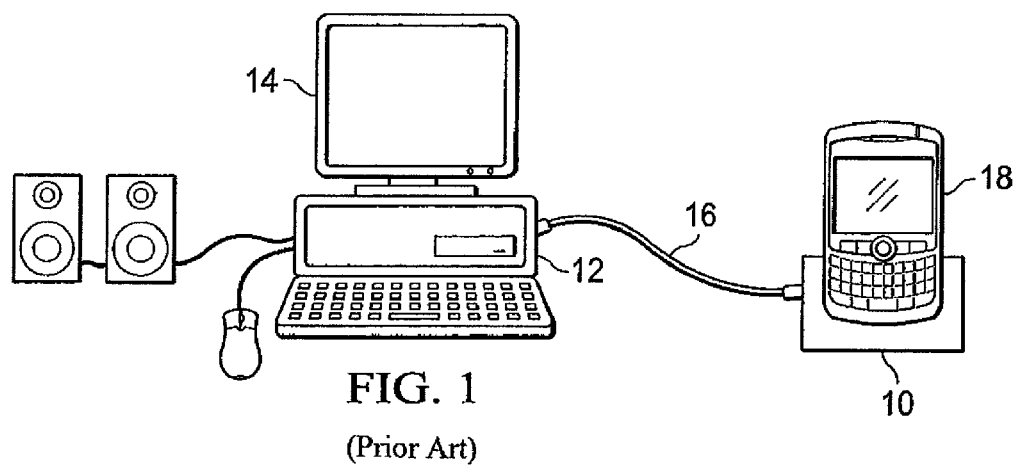
FIG. 1 presents a physical layout of a personal computer connected to a portable electronic device in a manner known in the art.
Figure 2:
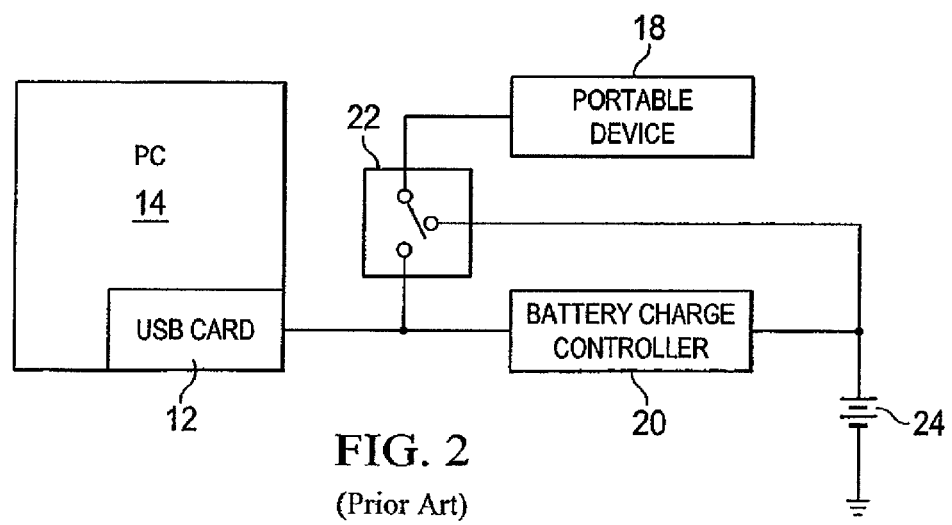
FIG. 2 presents an electrical block diagram of a battery charging circuit and portable device being powered in parallel.
Figure 3:
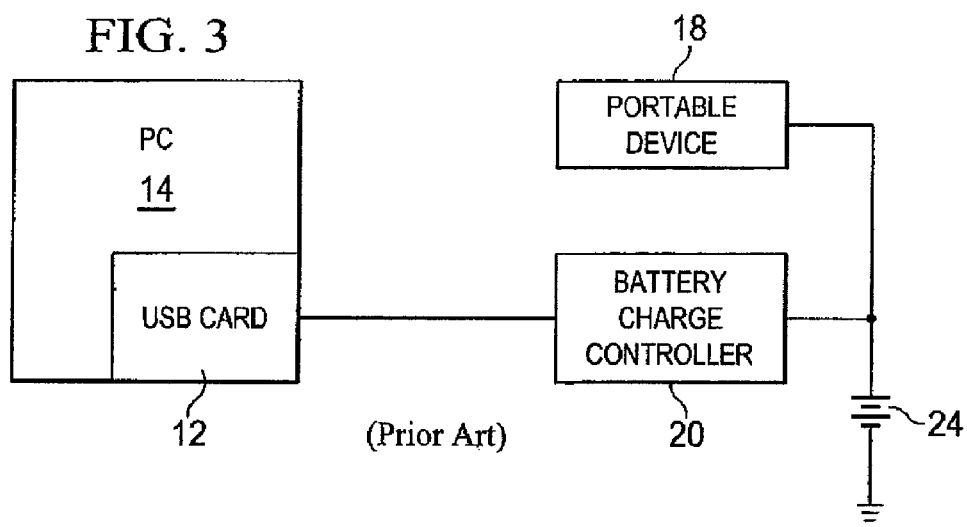
FIG. 3 presents an electrical block diagram of a battery and portable device both being powered by a battery charge controller.
Figure 4:
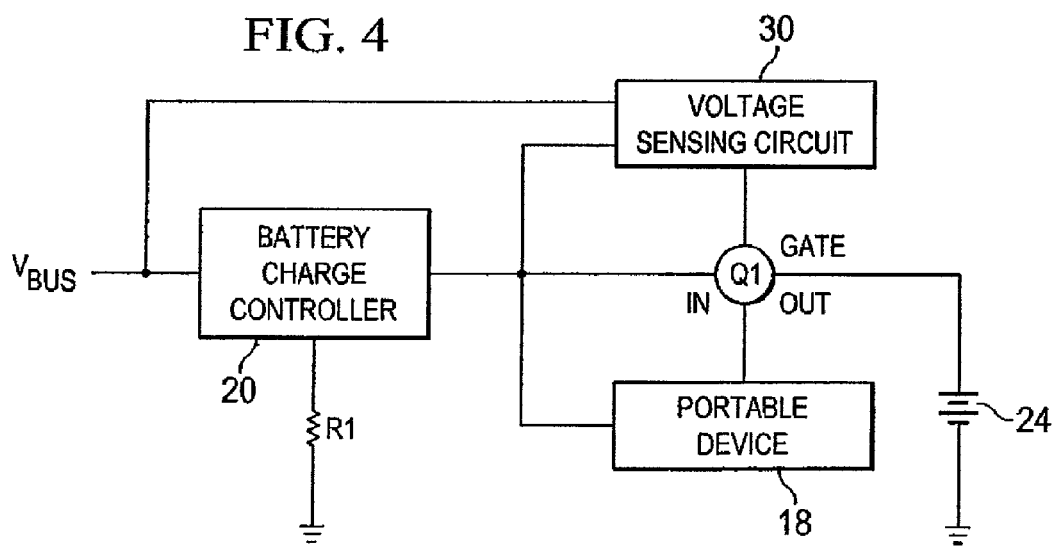
FIG. 4 presents an electrical schematic diagram of a battery charging circuit in a broad embodiment of the invention.

A circuit which overcomes a number of the problems in the art, is presented as a block diagram in FIG. 4. This figure presents a battery charging circuit built around a standard battery charge controller 20. In this embodiment of the invention, the battery charge controller 20 receives power from an external source ($V_{BUS}$) and feeds a portable device 18 and rechargeable battery or batteries 24 in parallel, but the feed to the battery 24 is made via a semiconductor switch Q1. Control of the current flow through the semiconductor switch Q1 is modulated by a voltage sensing circuit 30 which measures the voltage drop across the battery charge controller 20 and reduces the current flow through the semiconductor switch Q1 to the battery 24 when the voltage drop is too great.

The voltage sensing circuit 30 allows the total power consumption of the circuit to be inferred because the current output of the battery charge controller 20 is controllable, and power is the product of voltage drop and current. Most battery charge controllers 20 known in the art are provided with some sort of maximum current control. In the exemplary embodiments described hereinafter, for example, the maximum current output of battery charge controller 20 is simply set via an external resistor R1, though of course, the current output could also be controlled in many other ways (for example, being programmable, application specific, or set via some form of analogue or digital input signal).

Also in the embodiments described hereinafter, the voltage sensing circuit 30 itself is provided via an operational amplifier (op amp). Thus, the voltage drop across the battery charge controller 20 could simply be measured by comparing the voltage at the input and output of the battery charge controller 20, as shown in FIG. 4. Alternatively, one input to the op amp could be taken from the output of the battery charge controller 20, while the other could be some reference voltage $V_{REF}$; either emulating the $V_{BUS}$ input to the battery charge controller 20, or being scaled in some manner.

Thus, by monitoring the voltage drop across the battery charge controller 20 and knowing the maximum current that it may provide, the total power is known. Using this information to modulate the power to the battery 24, the total power dissipated by the battery charge controller 20 may be controlled.

Also, because this circuit modulates the power available to the battery 24, this circuit can be designed to ensure that the portable device 18 receives the power it requires for operation, while the rechargeable battery 24 only receives power when surplus capacity is available.

The total power consumed may therefore be modulated to stay within the limits of the power available from the USB port 12, and within the range of power that the battery charge controller 20 is able to dissipate. This allows battery charge controllers 20 to be used "off the shelf", rather than having to design new and larger battery charge controllers 20 which can dissipate enough power to supply both the portable device 18 and battery 24. It also allows the battery charge controller 20 or external driving element to be kept physically small.

With this power modulation mechanism, there is no longer power competition between the portable device 18 and the battery 24. The battery 24 receives power only if there is more power available than the portable device 18 requires. This may seem inconsistent with the charging requirements of batteries such as lithium cells, but the parameters of the circuit may easily be designed to accommodate them.

As noted above, battery charge controllers are usually designed to suit a particular battery or family of batteries. For example, lithium batteries are charged in three phases:
1. resolving deep discharge conditions;
2. constant current charging until the battery reaches a certain voltage level; and then
3. constant voltage charging until the charging current drops to a certain point.

During the initial handling of deep discharge conditions, comparatively little current is provided to the battery (typically 1/10 of the charge current). The circuit of the invention is therefore designed so that the battery will rarely be denied this very modest power demand.

The constant current charging phase draws the greatest amount of power, but lithium cells do not suffer if the charging current is modulated or cycled during this phase. Thus, it is this phase that is altered the greatest by the circuit of the invention. If the portable device 18 is used a great deal during this phase, the only negative impact will be that the charging of the battery 24 takes much longer.

During the constant voltage charging phase, the maximum current is less than that of the constant current phase and drops continuously as the battery 24 becomes fully charged. More important, the battery 24 voltage stays at a constant, and maximum, level during this phase, so the total power dissipated by the battery charge controller 20 will be lower during the constant voltage phase, than it was during the constant current phase.

As will be described in greater detail hereinafter, the voltage sensing circuit 30 is designed to saturate the semiconductor switch Q1 when the full charge voltage level is reached (i.e. the semiconductor switch Q1 does not restrict current flow at all at this point).

Figure 5:
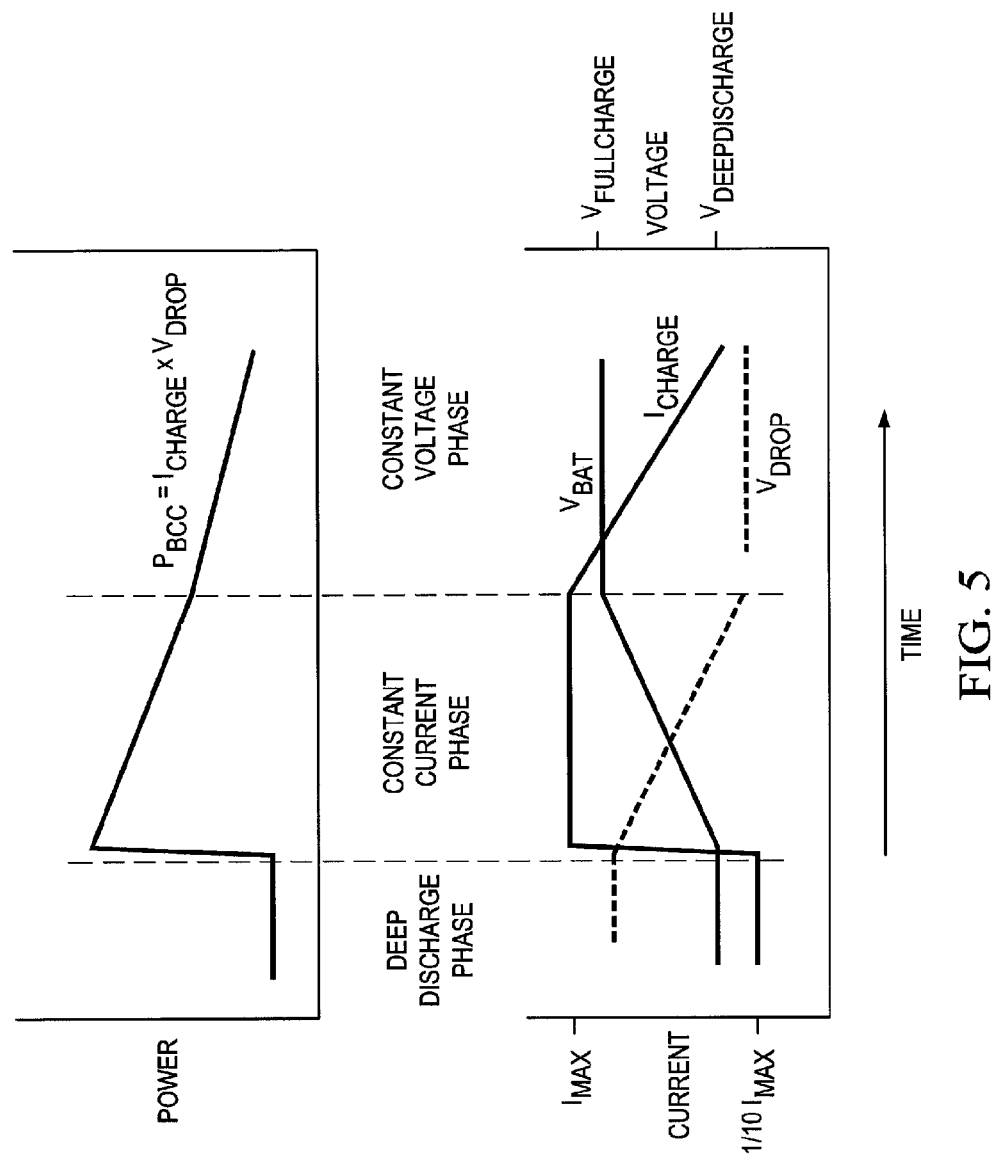
FIG. 5 presents a timing diagram of voltage, current and power curves for the charging of a lithium ion battery in an embodiment of the invention.

The change in power dissipation over time is shown in FIG. 5. Four curves are shown in this figure: the voltage of the battery 24, labelled $V_{BAT}$, the charge current, labelled $I_{CHARGE}$, the voltage drop across the battery charge controller 20, labelled $V_{DROP}$, and the total power dissipated, labelled PBCC. Note that $V_{DROP}$ varies inversely with $V_{BAT}$, and that the power dissipated by the battery charge controller 20, is the product of $I_{CHARGE}$ and $V_{DROP}$.

Clearly, during the conditioning phase, the battery voltage $V_{BAT}$ is low, so $V_{DROP}$ will be high. However, $I_{CHARGE}$ is also low during this phase (about 1/10 of $I_{MAXCHARGE}$, the maximum charging current) so the total power dissipated is modest.

During the constant current phase, the charge current rises to $I_{MAXCHARGE}$, but the voltage of the battery, $V_{BAT}$, drops as the battery becomes charged, so the power dissipated by the battery charge controller 20 drops over the course of this phase.

As the constant voltage phase begins, the battery voltage has reached its fully charged level, $V_{FULLCHARGE}$, so $V_{DROP}$ is at a minimum. As $I_{CHARGE}$ drops over the course of this phase, the power dissipated also continues to drop (noting again, that the power dissipated is the product of $I_{CHARGE}$ and $V_{DROP}$).

Clearly then, the greatest power level is drawn during the constant current phase. As noted above, the charging of the battery 24 can be safely cycled during this phase, so the restriction in current to the battery 24 during this phase, is allowable.

This circuit also allows the user to boot his portable device 18 very quickly because it isolates the battery 24 from the portable device 18. If the battery 24 and portable device 18 were connected when the battery charge controller 20 attempted to condition a deep discharged battery 24, the voltage at the portable device 18 would be drawn down to the level of the deep-discharged battery 24. Typically, this would be too low for proper operation of the portable device 18. With the circuit of the invention, the battery 24 and portable device 18 are isolated by Q1. Even if the battery 24 is in a deep-discharge state, the portable device 18 will still see a voltage that is high enough for proper operation.

The time for the portable device 18 to boot up is therefore only limited by the enabling time of the battery charge controller 20 itself. A typical figure for this ramp-up is 1 mS-4 mS, though it could vary from one battery charge controller 20 to another.

Thus, the use of the circuit in FIG. 4 allows computer data busses and similar power supplies with limited capacity, to supply power to portable devices and discharged batteries simultaneously.

A number of different embodiments of the invention will now be described. Each embodiment uses a very small number of simple, reliable components. Thus, as a whole, the invention provides an effective solution which is inexpensive, reliable and consumes minimal board space in a portable device.

Basic Implementation

Figure 6:
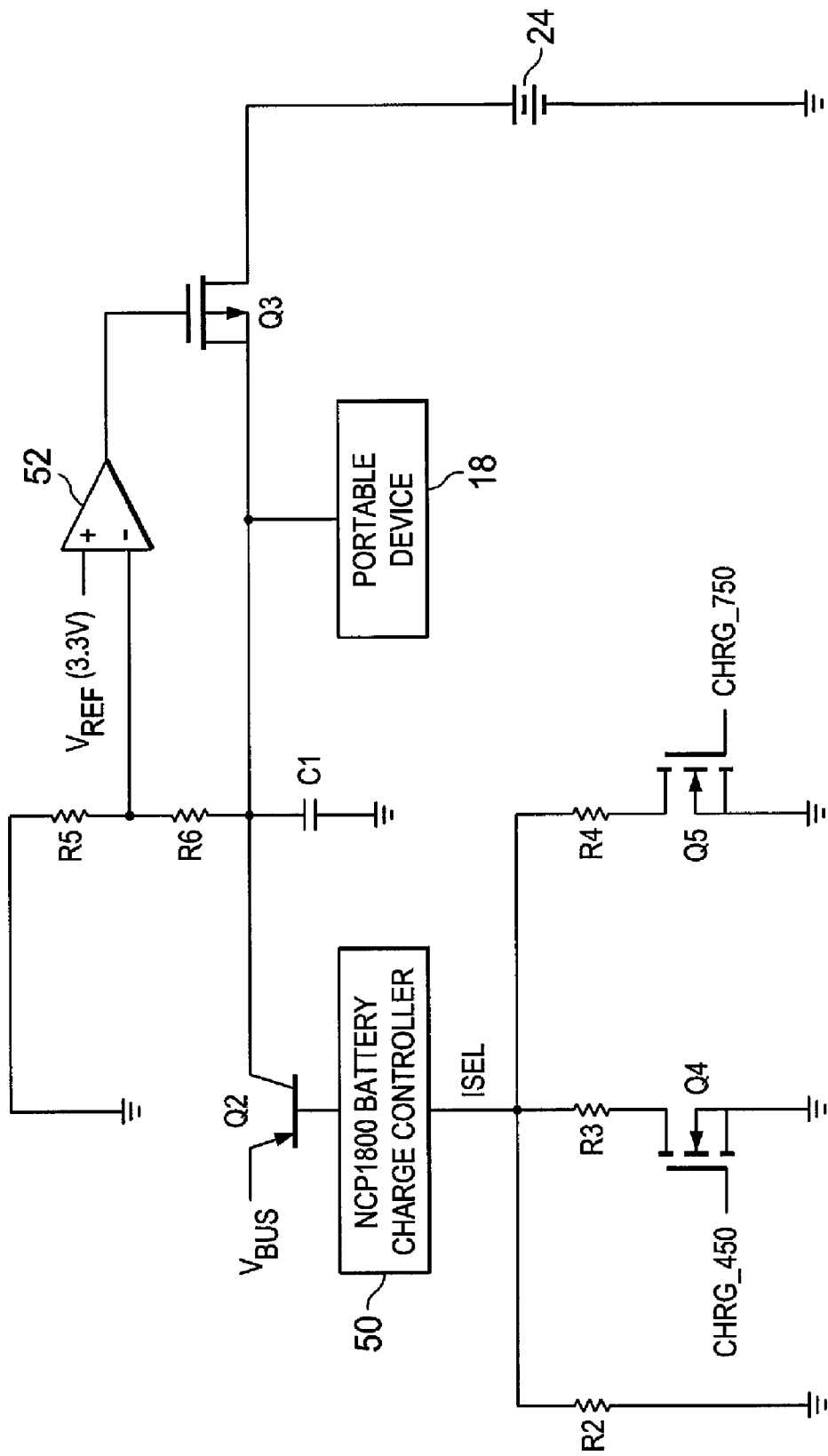
FIG. 6 presents an electrical schematic diagram of a battery charging circuit in a simple embodiment of the invention.

FIG. 6 presents an electrical schematic diagram of a charging circuit which employs four main components: an NCP1800 battery charge controller 50, a semiconductor Q2, which serves as external driving element for the battery charge controller 50, an operational amplifier (opamp) 52, and a MOSFET (metal oxide silicon field effect transistor) Q3, which controls the current to the rechargeable battery 24.

The NCP1800 battery charge controller 50 is a standard, single-cell, Lithium ion battery charge controller as known in the art. The maximum current that this device will provide is regulated by the resistance between pin ISEL and ground. In this case, three resistors R2, R3 and R4 are used to set the maximum current levels for different operating conditions. The default condition is that only 100 mA is available (low-power USB), which establishes the value for resistor R2. If it is detected that the device is plugged into a high-powered USB source, then the gate of MOSFET Q4 will be energized, and the resistance between ISEL and ground will be set by the resistance of R2 and R3 in parallel.

Similarly, if it is detected that the source of power for the circuit has even more power available (an AC plug-in or car adapter, for example), then MOSFET Q5 will be energized so that the resistance between ISEL and ground will be set by the resistance of R2 and R4 in parallel. The circuit of FIG. 6 will typically be included in the portable device 18 itself, or in a docking cradle 10, thus it should also be operable with such larger capacity power supplies.

Application notes from the manufacturer of the NCP1800 battery charge controller 50 are available which will assist the designer in establishing the specific parameters and values for resistors R2, R3 and R4 and the driving transistor Q2.

The voltage sensing portion of this circuit is provided by op amp 52, along with resistors R5 and R6, and capacitor C1. This circuit monitors the voltage on the collector side of Q2 (via voltage divider R5 and R6), and compares it to a reference level (in this case, $V_{REF}=+3.3V$). If the voltage on the collector side of Q2 drops, then the voltage drop across Q2 rises and the power it must dissipate rises. To reduce the power that must be dissipated, the op amp 52 restricts the current through Q3 increasing its drain source resistance.

Note that $V_{REF}$ may simply be provided from $V_{BUS}$ and a voltage regulator. $V_{REF}$ is used as an input to the op amp 52 rather than $V_{BUS}$ because the regulator will provide a constant output voltage, whereas $V_{BUS}$ has a wide range making the design more difficult. The values of resistors R5 and R6 are established simply by the need to scale the $V_{BUS}$ value to the $V_{REF}$ value.

Also, note that capacitor C1 is included in the circuit to smooth out fluctuations and to prevent oscillation.

As described above, this circuit allows the portable device 18 to draw power via Q2, without causing the combined draws of the portable device 18 and the battery 24 to exceed the power capacity of Q2. As the portable device 18 draws power, the voltage on the collector side of Q2 drops and the current via Q3 is throttled in a linear mode.

Power dissipation must be designed for the worst-case scenario. For example, if the maximum design parameters are as follows:

up to 0.85 A is available;

an input voltage could be as high as 6V; and pre-charging of the battery 24 is complete at 3.0V (that is where the highest charge current is delivered to battery, as shown in FIG. 5); then (6V-3V)*0.85 A=2.55 W of power that would be dissipated by the external drive element Q2 (note that in circuits which do not use such an element, all of this power would be dissipated by the battery charge controller 50).

This external drive element Q2 must dissipate heat generated by the current that flows through it. The more power that is dissipated, the larger physical size this element must be; generally, the surface area that a device requires, rises with the square of the power to be dissipated. That is, if the power is doubled, a transistor with four times the surface area is required. The sizes of transistors are standardized, so the preferred embodiment of this circuit is designed to employ SOT-23 (or superSOT-6) packages, which are capable of dissipating up to 1.6 W. The next size is SOT-223, which is considerably larger with twice the power dissipation.

As noted above, throttling of power to the battery 24 is done so that the current always satisfies the needs of the portable device 18 and any current left over (difference between the input current and the current to the portable device 18) is delivered to the battery 24. For example, suppose that the circuit is connected to a high power USB port (500 mA is available) and a portable device 18 such as portable Blackberry™ handheld device. When the Blackberry goes to sleep, it may only require 0.3 mA-0.7 mA so the balance of the available current (499.3 mA-499.7 mA) may be provided to battery 24. Once the Blackberry wakes-up, which it does periodically to perform house keeping jobs, it draws say 30 mA-70 mA, depending on what it does. At this point, the battery 24 receives 430 mA-470 mA. The analysis occurs when the Blackberry is to receive or transmit some data, or perform some other task. In each case, the power to the battery 24 is dynamically auto-adjusted.

When limited power is available, it is also desirable to cut off high-power consuming components, preserving power only for the processor. This is easily done by connecting only the processor and memory of the portable device 18, to Q2 as shown in FIG. 6, and connecting other high power consumers to the battery side of Q3. As a result, if we are operating with a limited current source (such as low-powered USB of 100 mA) and an excessive current component such as a vibrator (typically 120 mA) or a back-light (typically 150 mA) is turned on, the voltage output from Q2 would start to drop, causing Q3 to increase its Rds resistance and preserve the current needed by the processor.

Comprehensive Implementation

Figure 7A:
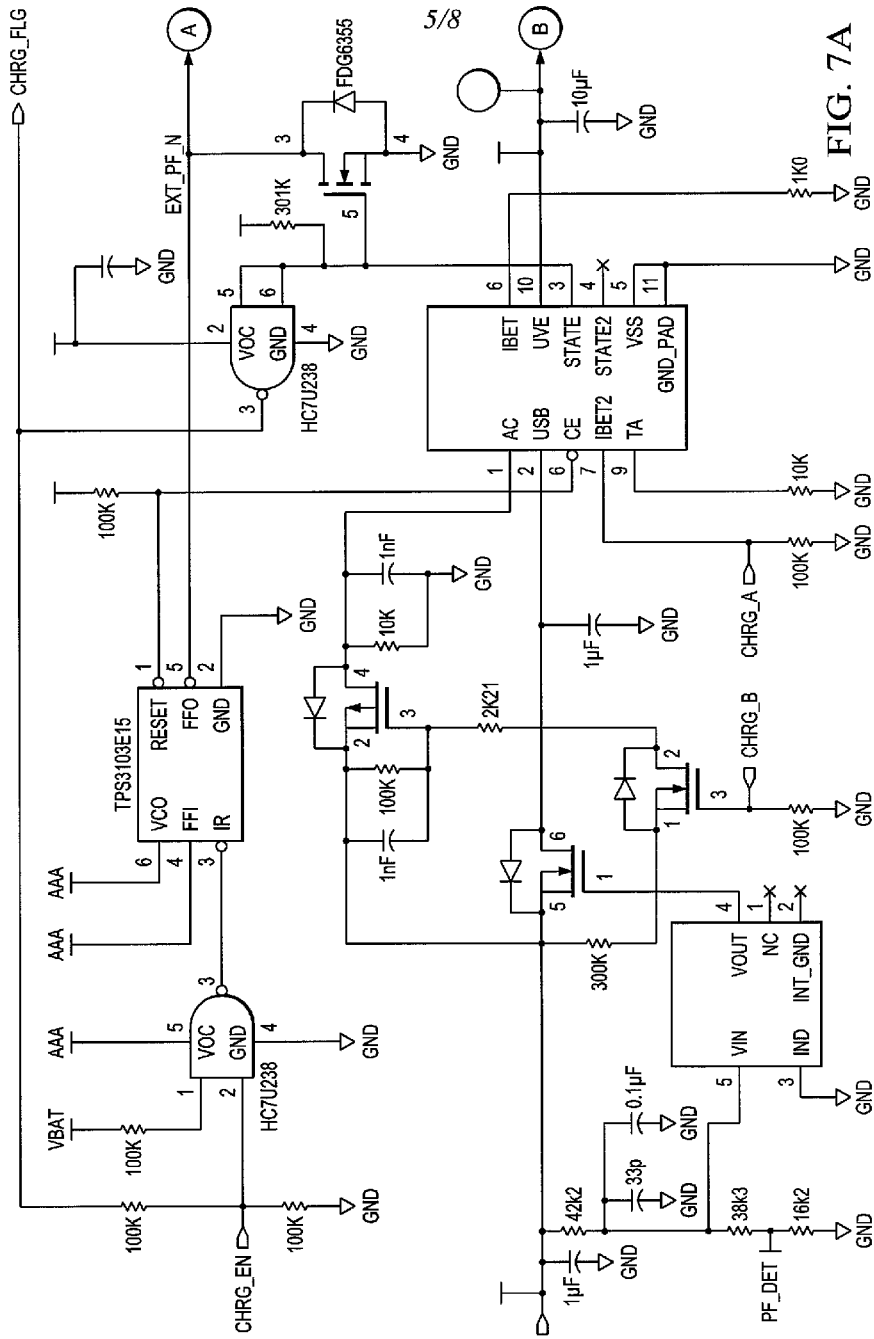
FIGS. 7A, 7B and 7C present an electrical schematic diagram of a battery charging circuit in a comprehensive embodiment of the invention.
Figure 7B:
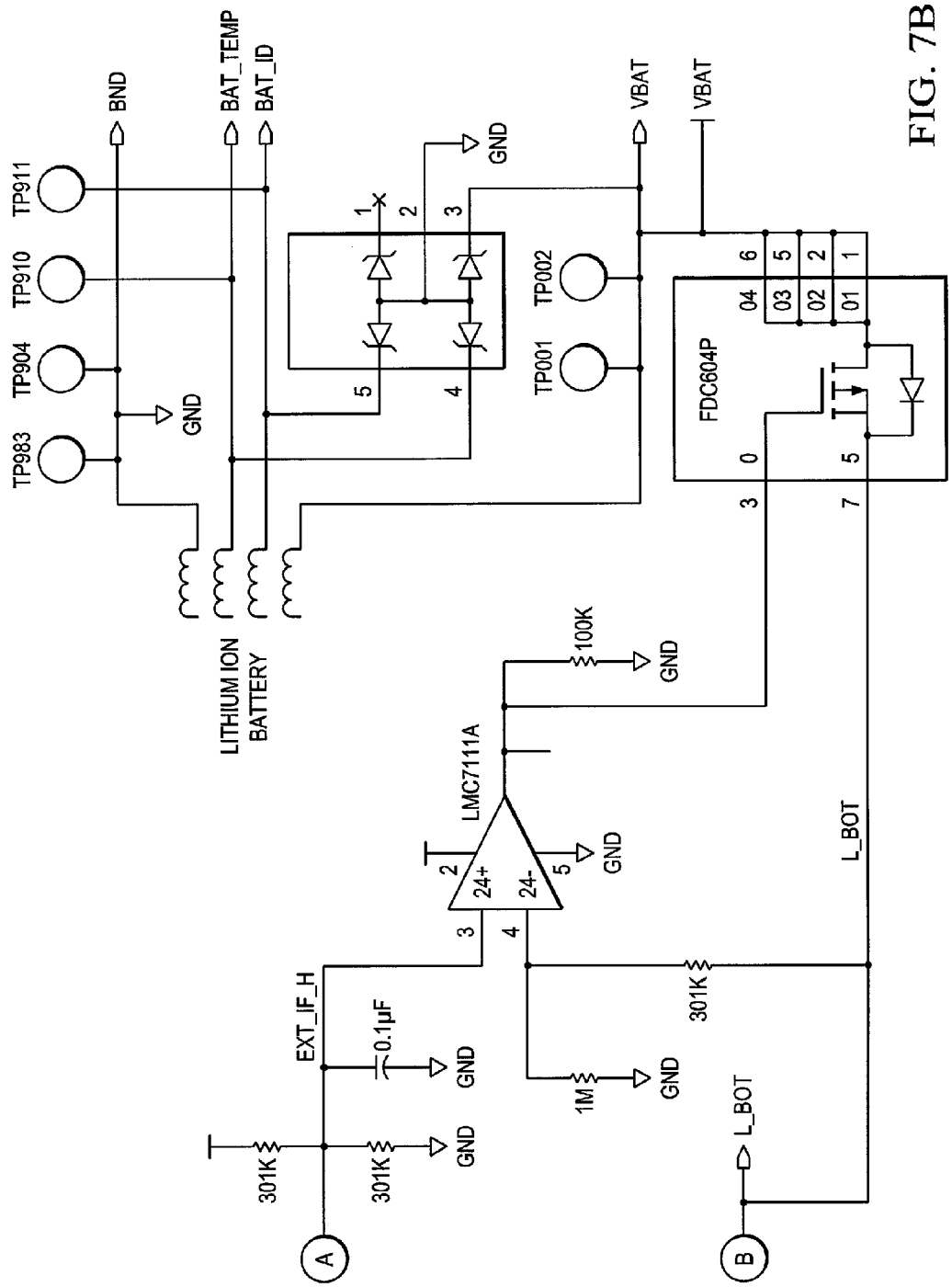
Figure 7C:
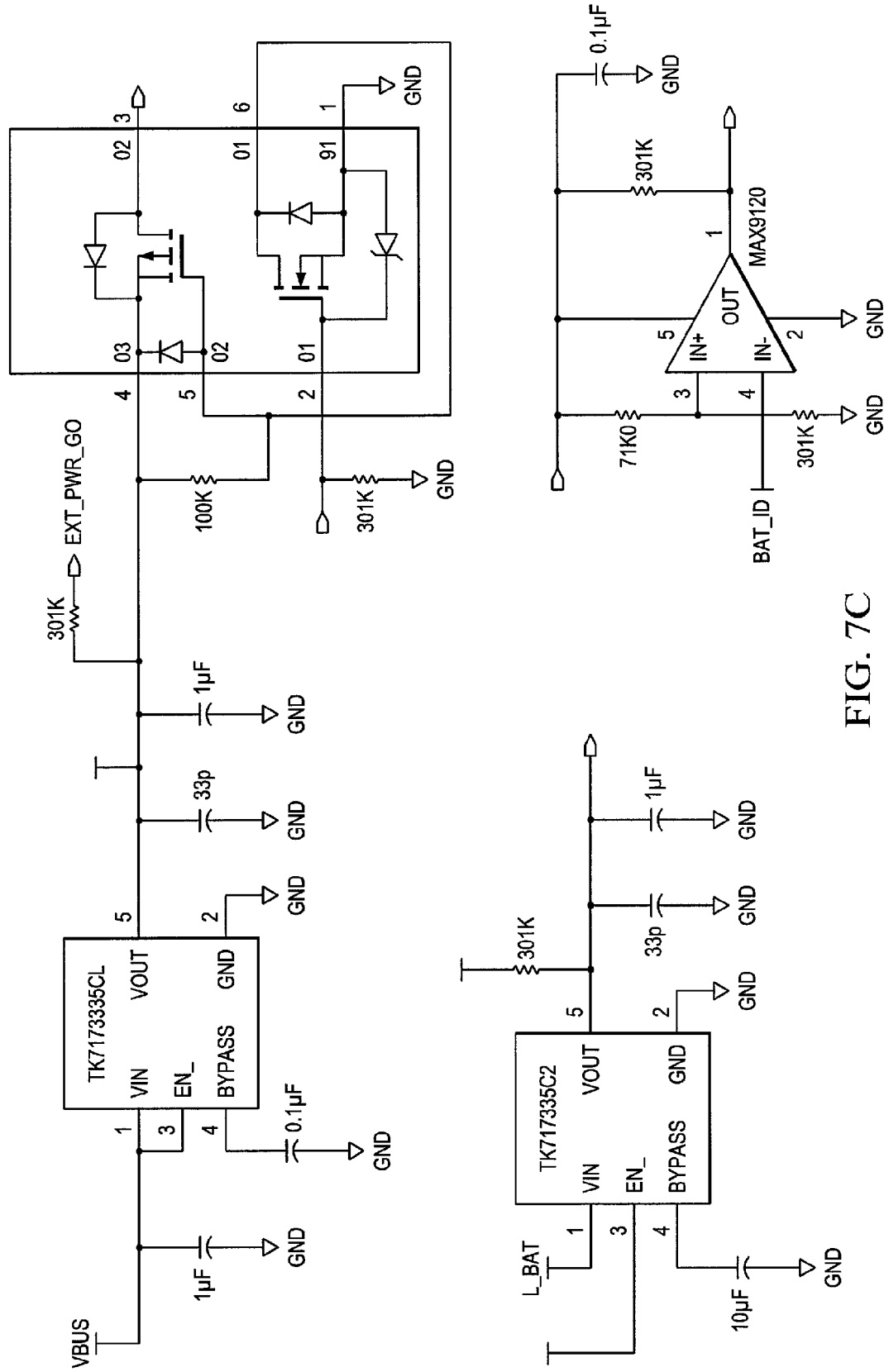

The design presented in FIGS. 7A through 7C uses the same basic circuitry as in FIG. 6, but adds several elements which provide further advantages. These advantages include the following:

- the battery can be charged with an input voltage being just above the battery level;
- the start-up of the portable device 18 when battery is dead or not present, is different from that of FIG. 6;
- the handling of input glitches from the external power supply is improved; and
- contrary to the instructions of the manufacturer of the battery charge controller used in this implementation, the VCC and IN pins are fed separately, to avoid back voltage leakage and potential latch-up problems in the battery charge controller.

The specific design parameters for this embodiment of the invention can be summarized as follows:

1. constant current, constant voltage charging capabilities (as required for charging of Lithium Ion batteries);
2. current selection for 100 mA, 500 mA and 750 mA power supplies;
3. operation of the portable device 18 when the rechargeable battery 24 is low, dead, or not present;
4. start-up and operation of the portable device 18 within less than 100 mS, in the cases the battery 24 is not present or it is dead;
5. compliance with USB suspend mode of operation (system should draw less than 500 uA);
6. over voltage protection above 5.8V up to minimum of 10V;
7. protection against a short circuit on the battery connector;
8. allow charging with the input voltage as low as the portable device 18 needs for its safe operation;
9. voltage in the range of 3.3V-3.6V for pull-up resistor on D+line;
10. provide means to connect and disconnect the voltage to pull-up resistor on D+line;
11. battery presence indication; and
12. providing status of the battery charge controller.

The general description of this comprehensive implementation of the invention follows:

The circuit of FIGS. 7A-7C centres around a Texas Instruments bq24020 Lithium Ion battery charge controller, labelled as U909 in FIG. 7C. This battery charge controller provides the constant current and constant voltage modes required to charge Lithium Ion cells, and supports externally programmable current limits. Its UVLO (under voltage lockout threshold) is provided by the PFI/PFO (U908) comparator (Texas Instruments TPS3103E15) with reference, and its threshold is set by the resistor dividers of the VBUS input. U908 is also used to guarantee initial start-up operation of U909 with minimum of 100 mS. This provides means to enumerate when operating with low/dead or without battery. Overvoltage protection (OVP) is provided by the U912 which is set to ~5.8V. Charging status is provided by the battery charge controller U909, which indicates whether or not the controller is delivering current to the system. Voltage for the D+pull-up resistor is provided by U901 (a low voltage dropout regulator, Toko TK71733SCL) and its switching capability via Q907. The same voltage is also used to power-up the components that are used only when the external power is available via VBUS (U906, U905, etc).

A comparator U905 (LMC7111A) and a MOSFET Q908 are used to boost the system voltage when operating with low/dead battery or without the battery. This closed loop also "throttles" current to the system under no battery, and low battery conditions. This occurs because when the L_BAT voltage drops (due to the system load) U905 acts to turn off Q908, directing more current to the system (away from battery).

Comparator U907 provides the battery presence status indicator.

Battery connector short circuit protection is NAND'ed (U906) with the charger enable functionality, thus automatically disabling the battery charge controller U909 when a short is present. The battery charge controller U909 automatically re-starts the charge if the battery voltage falls below an internal threshold, and automatically enters sleep mode when VCC supply is removed.

Theory of Operation

Note that the inputs and outputs of the circuit in FIGS. 7A-7C can be summarized as follows:

| Signal | Connection | Description |
|---|---|---|
| VBUS | To Power source (USB or charger) | Power input to the device, used for battery charging or device operation |
| CHRG_EN | System Control Signal | enables/disables charger and current delivery to the system; Reset State: HIZ (pull-down resistor makes RST = LOW, charger is OFF) |
| CHRG_A | System Control Signal | enables 450 mA current limit for the charger; reset state: LOW |
| CHRG_B | System Control Signal | enables 750 mA current limit for the charger; reset state: LOW |
| USB_CD | System Control Signal | goes HIGH every time the VBUS is above ~2.1 V |
| CHRG_FLG | System Control Signal | charger status flag; reset state: LOW |
| VBAT | To rechargeable battery | main power source for the rechargeable battery, reset state: battery voltage value |
| L_BAT | To portable device | provides system power, reset state: battery voltage level |

VBUS, the input voltage, is presented via Q904a to the USB input pin of the battery charge controller U909. Q904 is used for OVP and is controlled by U912 (3.0V under voltage detector, National Semiconductor LMS33460) whose input voltage is provided via resistor divider R937 and R925+ R926. Its open drain output keeps Q904 in saturation while VBUS/(R937+R925+R926)*(R925+R926)<3.0V, which provides OVP above ~5.8V.

While USB input to the battery charge controller U909 is present, 100 mA and 500 mA current limit could be selected via CHRG_B (CHRG_B=LOW provides 100 mA, and CHRG_B=HIGH provides 500 mA). Resistor R941 sets default LOW logic level to the ISET2 input of U909, thus allowing a 100 mA default current limit. This is important as it makes the system compliant with the USB specification when operating with low/dead or without battery. A USB device is limited to 100 mA operation, until the device enumerates to 500 mA (if the host USB supports this).

Resistor R940 provides a default LOW input level to the gate of Q905a, which keeps it out of saturation (OFF) while in reset mode and therefore sets the gate voltage of Q904b at its source level (at the level of VBUS voltage) which disallows the VBUS presence at AC input of the battery charge controller U909 controller. Resistors R932 and R936 are pull-up resistors for Q904.

Charging current of 750 mA (used for non-USB power sources) could be selected by setting CHRG_A=HIGH, which sets Q905a in saturation (ON) and in turn puts Q904b in saturation (ON) as well, presenting VBUS voltage at AC input of the battery charge controller U909. As an AC input to U909 provides override over the USB input (if voltage on the AC input exceeds 1.5V charging input-output path is defaulted to AC input) charging current is now programmed by the value of R939 resistor.

Capacitor C925 is used to prevent Q904b from conducting because of its gate-to-drain parasitic (gate-to-drain capacitance would charge the gate, if pulled up to its source, at RC time) capacitance during the fast transient responses of VBUS voltage, and allows the gate to rapidly charge at the VBUS level keeping the Q904b in saturation. Resistor R935 is used to limit the discharge current of C925 so that Q905a does not exceed its specified limits. R933 is a pull-down resistor that prevents an AC input to the battery charge controller U909 from floating. C926 and C927 are input bypass capacitors. It is important to keep the total input capacitance below 10 uF to comply with the USB inrush current specification.

The total current that the system draws from VBUS, should not exceed 500 uA when in suspend mode. This is mainly accomplished by the very low operating current of the battery charge controller U909 (typically <100 uA) in the OFF mode of operation. Q905b is used to disable the LBAT voltage booster when the battery charge controller U909 is not delivering any current to the battery 24 and/or portable device 18. It does this by shorting the positive input of the U905 which makes its output to drive Q908 into saturation (ON).

U906b is used as an inverter of the CHRG_FLG flag, simply to make it compatible with the software and hardware the rest of the system. R931 is a pull-up resistor for CHRG_FLG open drain output.

Processor supervisor U908 has dual functionality. Its PFI (power fail input) input level is set by the resistor divider R937+R925 and R926 so it matches the U908 internal reference when VBUS drops down to 3.3V (or the value of LBAT voltage set by the U905 and Q908 when operating with low/dead or without battery), causing its open drain output (power fail output —PFO) to go to GND. This would force the positive input node of U905 to go to GND and put Q908 in saturation (ON). This set of circuitry creates an UnderVoltage Lock Out (UVLO) threshold for the L_BAT boost circuit. This is important as the U909 can operate down to 2.5V, causing its status flag to indicate current delivery to the system even though it really does not (the battery 24 internally disconnects below 2.5V). Such a condition would cause the system to reset (for battery voltage levels lower than the preset minimum LBAT value) as the U905/Q908 would try to keep the LBAT voltage, at the preset value, by disconnecting the battery 24 and thinking that the battery charge controller U909 is delivering enough current.

The second functionality of U908 is the start-up override on the U909-CE input pin, which provides power to the system for a minimum of 100 mS to initiate and properly enumerate on the USB-BUS. This is accomplished by the keeping its RESET open drain output at GND before the VBUS reaches 2.5V and than 100 mS after. This keeps the battery charge controller U909 enabled during that time.

U906a provides NAND'ed functionality of CHRG_EN and presence of the short on the battery connector. A shorted battery disables the battery charge controller U909 in hardware. By having the voltage on the VBAT, CHRG_EN control line could enable or disable the battery charge controller U909 (CHRG_EN=HIGH would enable the battery charge controller U909 by pulling low the MR input pin of U908). R921 provides isolation from the battery and input of U906a so that the current drain is limited to maximum of 42 uA even though the U906 creates HIZ (high impedance) inputs and outputs when power is not present at its VCC.

R924 provides default LOW input level for U906a during the host processor reset. R920 is pull-up resistor for CHRG_FLG making it valid only during the time the battery charge controller U909 is enabled.

U907 produces battery presence indicator by monitoring BAT_ID input from the battery pack. Its output would be at HIGH logic level any time the BAT_ID resistor is present and its pull-up is provided by BAT_CHK signal.

Low drop out voltage regulator U901 (TOKO TK71733SCL) provides a regulated 3.3V supply for the USB data line pull up resistors, as well as a 3.3V supply for various components in the charger circuit and as an indicator that an external source is attached (EXT_PWR_CD). U901 has reverse bias and overcurrent protection, built-in thermal shutdown and short circuit protection.

U901 provides power for U906, U908, and U905 as well as the 3.3V voltage for pull-up resistor. It is also used to provide the indication of VBUS presence to the system (EXT_PWR_CD). R904 is used to limit the current to the input pin of the system. C915 is input bypass capacitor and C922 is output filtering capacitor. C910 is used to filter RF noise coming from the RF circuitry, and C912 is bypass capacitor for internal reference.

Q907 is used to switch USB_VPU voltage and allow soft enumeration on the USB bus. R909 provides default OFF condition for P-FET and R905 provides fast discharge of the USB_SFTCN control line (during the RST or suspend initiation without battery presence).

U904 provides supply voltage for USB transceiver chip (it is a standard voltage regulator as known in the art). It is enabled when VBUS is present and automatically shuts down the power when VBUS goes OFF. C921 and C913 are output filter capacitors. U904 can optionally be removed to save cost; R942 should then be populated to supply power to the USB transceiver chip. U904 should only be required if the transceiver chip does not meet USB suspend current requirements (and our device can wake-up from suspend by looking at only D+/D− line responses).

U905 and Q908 are mainly used to maintain L_BAT=VBAT, when VBUS is not present, and to keep L_BAT to at least 3.6V when VBUS is present (while charger is delivering current to the system) and battery voltage is less than 3.6V. It is also used to split total power dissipation into two (between the battery charge controller's main pass element and Q908) to allow for higher charging currents at all battery voltage levels.

Another important functionality of this circuitry is to allow proper USB enumeration when battery is low/dead or not present, by allowing the system to the wake up within 15 mS when battery not present, or dead. Once the U909 delivers the whole programmed current, U905/Q908 will maintain the minimum preprogrammed voltage at L_BAT (3.5V in our case) by varying the drain-to-source resistance of Q908.

U905's positive input is used as a reference and is set by R934 and R913. C924 allows a slow ramp-up of LBAT so that the battery charge controller U909 can deliver full programmed current until Q908 requests voltage increase on L_BAT (if needed). Resistor dividers R916 and R915 are used to set the "minimum voltage" at L_BAT, while the R914 provides a pull-down resistor for the gate of Q908.

U907 provides the system with indication of battery presence. R927 and R929 are used to set the reference and R928 is pull-up resistor to open drain output of U907. BAT_ID is than presented to its negative input and NO_BAT_N is set accordingly.

The preferred values for the components in this circuit are as shown in FIGS. 7A-7C. These values will, of course, vary with the application and design parameters.

Software Embodiments

Rather than using only electronic hardware as shown above, the invention may also be implemented using a combination a hardware and software components, including programmable devices such as digital signal processors (DSPs), micro-controllers, field programmable gate arrays (FPGAs), application specific integrated circuits (ASICs) and the like. Such an embodiment could be implemented as shown in the flow chart of FIG. 8.

Like the embodiments described above, this method could be used to charge any rechargeable battery in a portable or similar electronic device. Any external power supply could be used, though the invention is most useful with power supplies of limited capacity.

Figure 8:
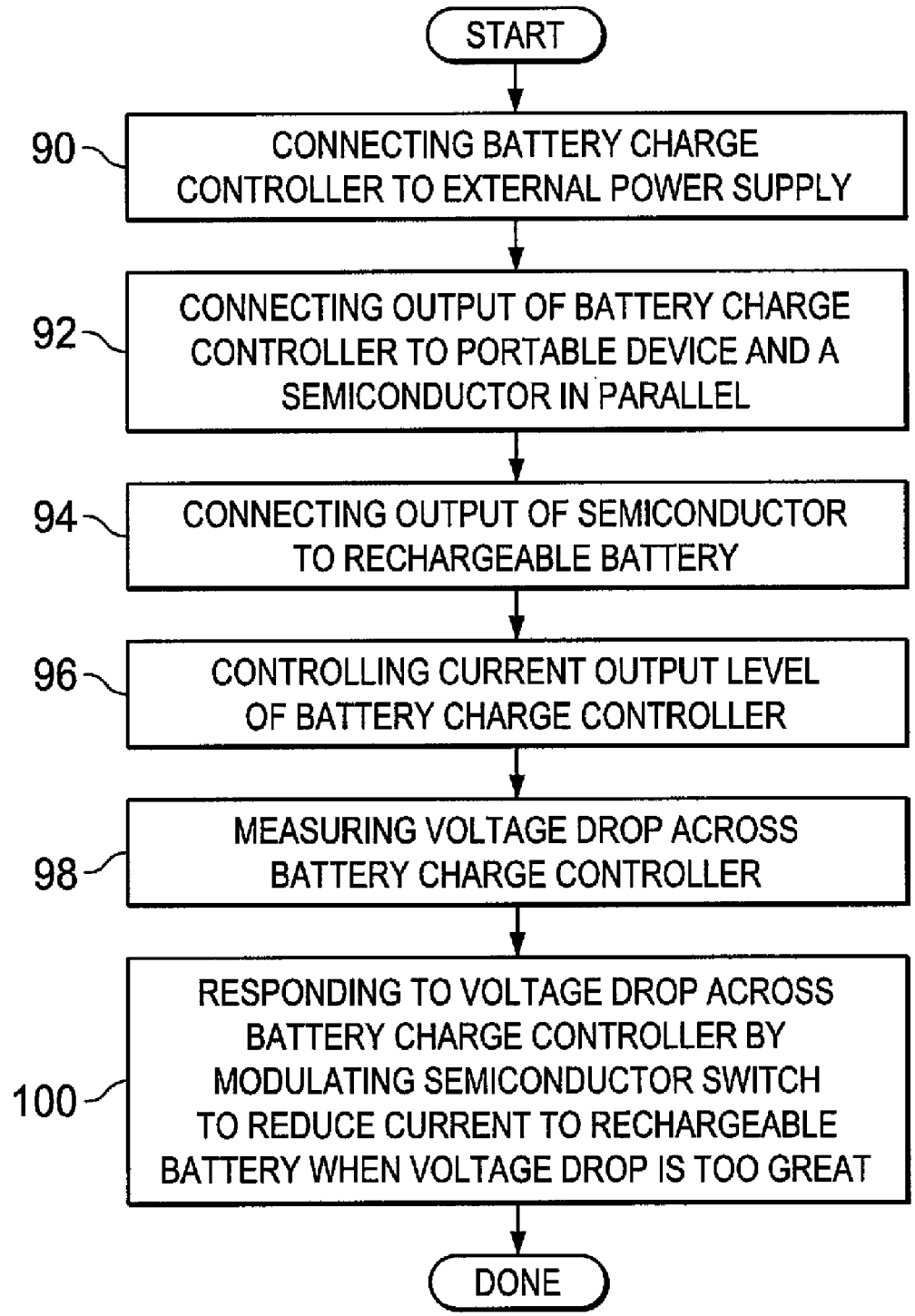
FIG. 8 presents a flow chart of a method of operating a battery charging circuit in an embodiment of the invention.

As shown in FIG. 8, the method of the invention begins at step 90 by connecting the input of a battery charge controller 20 to the external power supply, preferably via a USB cable and connectors 16, and a cradle 10 to hold the portable device 18. The output of the battery charge controller 20 is connected in parallel, to the portable device 18 and the input of the semiconductor switch Q1, per step 92, and the output of said semiconductor switch Q1 is connected to the rechargeable battery 24 per step 94.

Next, the current output of the battery charge controller 20 is controlled in some manner, at step 96. As noted above this may be done in many ways, for example, a DAC (digital to analogue converter) output of a micro-controller could be used to send an appropriate signal to the current control input of the battery charge controller 20.

The voltage drop across the battery charge controller 20 is then measured at step 98. This task could also be performed in many ways. For example, many micro-controllers provided with integral ADCs (analogue to digital converters) which could be used to perform this function.

Because the current is controlled at step 96, and the voltage drop across the battery charge controller 20 is measured at step 98, this methodology can deduce what the power dissipation is for the battery charge controller 20. The method of the invention is therefore able to control the power dissipation by modulating the semiconductor switch Q1 in response to the voltage drop across the battery charge controller 20 at step 100, reducing the quantity of current supplied to the rechargeable battery 24 when the voltage drop is too great.

In this way, the total power dissipated by the battery charge controller 20 is controlled; the portable device 18 receiving the power it needs to operate and the rechargeable battery 24 receiving any additional available power.

The balance of the software code needed to perform this algorithm would be straightforward to one skilled in the art.

The method steps of the invention may be embodiment in sets of executable machine code stored in a variety of formats such as object code or source code, integrated with the code of other programs, implemented as subroutines, by external program calls or by other techniques as known in the art.

Even the hardware embodiments of the invention could be encoded in a software form such as the hardware development languages (HDL code) used to fabricate integrated circuits. This HDL or similar code could be stored on any electronic memory means such computer diskettes, CD-Roms, Random Access Memory (RAM) and Read Only Memory (ROM). As well, electronic signals representing this software code may also be transmitted via a communication network.

Options and Alternatives

While particular embodiments of the present invention have been shown and described, it is clear that changes and modifications may be made to such embodiments without departing from the true scope and spirit of the invention. For example:

1. the circuit of the invention could be used with any manner of power source including: conventional AC power supplies (often referred to as "bricks"), computer data busses such as USB ports, external battery packs, laptop power supplies, and DC outlets in automobiles and on aircraft;
2. any manner of electrical appliance could be charged with such a circuit including portable laptop computers, personal digital assistants (PDAs), cellular telephones, wireless email and paging devices; and
3. any manner of rechargeable battery could be used including single or multiple lithium-ion, nickel-cadmium, or other types of cells.

Again, such implementations would be clear to one skilled in the art from the teachings herein, and do not take away from the invention.

What is claimed is:

1. A battery charging circuit, comprising:
    a semiconductor switch having an output connected to a rechargeable battery and configurable to isolate the rechargeable battery from a portable device;
    a battery charge controller configured to receive power from an external universal serial bus (USB) port, and supply output power to the portable device having at least one function unrelated to the battery charge controller and to the rechargeable battery through the switch;
    the battery charge controller being further configured to limit the output power such that the portable device and the rechargeable battery may not draw more than a predetermined maximum current available from the USB port; and
    a voltage sensing circuit configured to measure a voltage drop across the battery charge controller, and respond to the voltage drop across the battery charge controller by modulating the switch to control an amount of current supplied to the rechargeable battery such that the portable device receives a predetermined amount of power needed to operate and the rechargeable battery receives a remainder of the power available from the battery charge controller.

2. The battery charging circuit of claim 1, further comprising:
    an external driving semiconductor controlled by the battery charge controller and operable to carry supply current from the USB port to the portable device and the rechargeable battery, wherein the supply current passes through the external driving semiconductor rather than through the battery charge controller.

3. The battery charging circuit of claim 2, wherein the voltage sensing circuit includes an operational amplifier.

4. The battery charging circuit of claim 3 where the voltage sensing circuit comprises:
    an operational amplifier configured to compare a voltage signal from the battery charge controller with a reference voltage signal, and further configured to respond to a voltage difference in which the voltage signal is less than the reference voltage by reducing the current to the rechargeable battery.

5. The battery charging circuit of claim 3, wherein the voltage sensing circuit includes an operational amplifier for comparing the voltage on the output of the battery charge controller to a reference voltage.

6. The battery charging circuit of claim 2 where low-power, critical components of the portable device are fed from the battery charge controller, and high-power, non-critical components of said portable device are fed from the rechargeable battery.

7. The battery charging circuit of claim 6 where the low-power critical components include at least one of a memory and a microprocessor.

8. The battery charging circuit of claim 6 where the high-power, non-critical components include at least one of a back lighting system and a vibrator.

9. The battery charging circuit of claim 2, wherein the external driving semiconductor includes a transistor.

10. The battery charging circuit of claim 4 wherein the operational amplifier circuit further includes a voltage divider for scaling down the voltage signal from the battery charge controller and the reference voltage signal is scaled down proportionally.

11. The battery charging circuit of claim 2, wherein the pre-determined maximum current that may be drawn from said battery charge controller is limited by an external resistance to ground.

12. The battery charging circuit of claim 1, further comprising:
a semiconductor switch coupled between the battery charge controller and the rechargeable battery, the semiconductor switch being controlled by the voltage sensing circuit to limit the amount of current supplied to the rechargeable battery.

13. The battery charging circuit of claim 1, wherein the battery charge controller may be configured to set the pre-determined maximum current depending on the current limits of the USB port.

14. A battery charging circuit comprising:
a semiconductor switch having an output connected to a rechargeable battery and configurable to isolate the rechargeable battery from a portable device;
a battery charge controller configured to receive power from an external universal serial bus (USB) port, and supply output power to the portable device and to the rechargeable battery through the switch;
the battery charge controller being further configured to limit the output power such that the portable device and the rechargeable battery may not draw more than a pre-determined maximum current available from the USB port, wherein the battery charge controller may be configured to send the pre-determined maximum current depending on the current limits of the USB port and wherein the pre-determined maximum current available from the USB port may be set to about 100 mA for a low-power USB port and may be set to about 500 mA for a high-power USB port; and
a voltage sensing circuit configured to measure a voltage drop across the battery charge controller, and respond to the voltage drop across the battery charge controller by modulating the switch to control an amount of current supplied to the rechargeable battery such that the portable device receives a predetermined amount of power needed to operate and the rechargeable battery receives a remainder of the power available from the battery charge controller.

15. The battery charging circuit of claim 1, wherein the battery charge controller is further configured to receive power from a non-USB source.

16. The battery charging circuit of claim 15, wherein the battery charge controller may be configured to set the pre-determined maximum current depending on whether power is received from the USB port or the non-USB source.

17. The battery charging circuit of claim 15, wherein the non-USB source is an AC plug-in adapter.

18. The battery charging circuit of claim 15, wherein the non-USB source is a DC/DC adapter for use with an automobile.

19. A battery charging circuit comprising:
a semiconductor switch having an output connected to a rechargeable battery and configurable to isolate the rechargeable battery from a portable device;
a battery charge controller configured to receive power from either an external universal serial bus (USB) port or a non-USB source, and supply output power to the portable device and to the rechargeable battery through the switch;
the battery charge controller being further configured to limit the output power such that the portable device and the rechargeable battery may not draw more than a pre-determined maximum current available from the USB port and wherein the battery charge controller may be configured to set the pre-determined maximum current to one of a plurality of current limits depending on whether power is received from a low-power USB port, a high-power USB port or a non-USB source; and
a voltage sensing circuit configured to measure a voltage drop across the battery charge controller, and respond to the voltage drop across the battery charge controller by modulating the switch to control an amount of current supplied to the rechargeable battery such that the portable device receives a predetermined amount of power needed to operate and the rechargeable battery receives a remainder of the power available from the battery charge controller.

20. A system for charging a rechargeable battery for a portable device having a function unrelated to charging the rechargeable battery, using power supplied by a universal serial bus (USB) port, comprising:
means for receiving power from the USB port;
means for supplying the received power to the rechargeable battery and to the portable device, wherein the supplied power is limited such that the rechargeable battery and the portable device may not draw more than a pre-determined maximum amount of current available from the USB port; and
means for both isolating the rechargeable battery from the portable device and controlling an amount of current supplied to the rechargeable battery such that the portable device receives a pre-determined amount of the received power needed to operate and the rechargeable battery receives a remainder of the received power.

* * * * *

UNITED STATES PATENT AND TRADEMARK OFFICE
CERTIFICATE OF CORRECTION

PATENT NO. : 7,791,319 B2
APPLICATION NO. : 10/372180
DATED : September 7, 2010
INVENTOR(S) : Dusan Veselic et al.

It is certified that error appears in the above-identified patent and that said Letters Patent is hereby corrected as shown below:

Col. 6, line 49, delete "," after "maximum".

Col. 9, line 65, "centres around" should read -- centers around --.

Col. 11, lines 45 and 46, "hardware the rest" should read -- hardware and the rest --.

Col. 11, line 63, delete both "," before and after "at the present value".

Col. 12, line 4, "and than 100" should read -- and then 100 --.

Col. 13, lines 16 and 17, "combination a hardware" should read
--combination of hardware --.

Col. 13, line 60, "may be embodiment" should read -- may be embodied --.

Col. 14, line 2, "such computer" should read -- such as computer --.

Signed and Sealed this

Sixteenth Day of November, 2010

David J. Kappos
*Director of the United States Patent and Trademark Office*